United States Patent
Shaffer, II et al.

(10) Patent No.: US 8,357,469 B2
(45) Date of Patent: Jan. 22, 2013

(54) BIPOLAR BATTERY ASSEMBLY

(75) Inventors: Edward Otto Shaffer, II, Midland, MI (US); William Buttfield Brecht, Long Beach, CA (US)

(73) Assignee: Advanced Battery Concepts, LLC, Clare, MI (US)

( * ) Notice: Subject to any disclaimer, the term of this patent is extended or adjusted under 35 U.S.C. 154(b) by 385 days.

(21) Appl. No.: 12/690,533

(22) Filed: Jan. 20, 2010

(65) Prior Publication Data

US 2010/0183920 A1 Jul. 22, 2010

Related U.S. Application Data

(60) Provisional application No. 61/146,270, filed on Jan. 21, 2009.

(51) Int. Cl.
| | |
|---|---|
| *H01M 4/13* | (2010.01) |
| *H01M 4/64* | (2006.01) |
| *H01M 4/72* | (2006.01) |
| *H01M 4/74* | (2006.01) |
| *H01M 4/76* | (2006.01) |
| *H01M 4/80* | (2006.01) |
| *H01M 4/82* | (2006.01) |
| *H01M 6/48* | (2006.01) |
| *H01M 10/18* | (2006.01) |

(52) U.S. Cl. ........ 429/238; 429/210; 429/233; 429/234; 429/236; 429/341; 29/623.1

(58) Field of Classification Search ................ 429/210, 429/233, 234, 236, 238, 241; 29/623.1
See application file for complete search history.

(56) References Cited

U.S. PATENT DOCUMENTS

| | | | |
|---|---|---|---|
| 4,510,219 A | | 4/1985 | Rowlette |
| 4,542,082 A | * | 9/1985 | Rowlette ...................... 429/210 |
| 4,637,970 A | | 1/1987 | Yeh |
| 4,658,499 A | | 4/1987 | Rowlette |
| 4,752,545 A | | 6/1988 | Brecht |
| 4,900,643 A | | 2/1990 | Eskra |
| 5,035,045 A | | 7/1991 | Bowen |
| 5,510,211 A | | 4/1996 | Sundberg |
| 5,582,937 A | | 12/1996 | LaFollette |
| 5,585,209 A | | 12/1996 | Feldstein |
| 5,593,797 A | | 1/1997 | Brecht |
| 5,688,615 A | | 11/1997 | Mrotek |
| 5,800,946 A | | 9/1998 | Grosvenor |

(Continued)

FOREIGN PATENT DOCUMENTS

| | | | |
|---|---|---|---|
| CH | 248315 A | | 4/1947 |
| EP | 2017918 A1 | | 1/2009 |
| JP | 51069142 A | | 6/1976 |
| JP | 59138076 A | | 8/1984 |
| WO | WO 2006105187 A1 | * | 10/2006 |
| WO | 2007132621 A1 | | 11/2007 |

OTHER PUBLICATIONS

Koseki et al., Abstract of JP 59-138076 A, Aug. 1984.*

*Primary Examiner* — Basia Ridley
*Assistant Examiner* — Sean P Cullen
(74) *Attorney, Agent, or Firm* — Dobrusin & Thennisch PC

(57) ABSTRACT

A bipolar battery construction is disclosed comprising a substrate, openings in the substrate, an electrically conductive material placed within the openings, a negative and positive current collector foil placed on opposing sides of the substrate and negative and positive pasting frame members. The electrically conductive material may have a melting point below the thermal degradation temperature of the substrate.

19 Claims, 7 Drawing Sheets

U.S. PATENT DOCUMENTS

| | | |
|---|---|---|
| 5,916,709 A | 6/1999 | Arias |
| 6,017,653 A | 1/2000 | Petrakovich |
| 6,077,623 A | 6/2000 | Grosvenor |
| 7,275,130 B2 | 9/2007 | Klein |
| 2004/0072074 A1 | 4/2004 | Partington |
| 2010/0183920 A1 | 7/2010 | Shaffer, II |

* cited by examiner

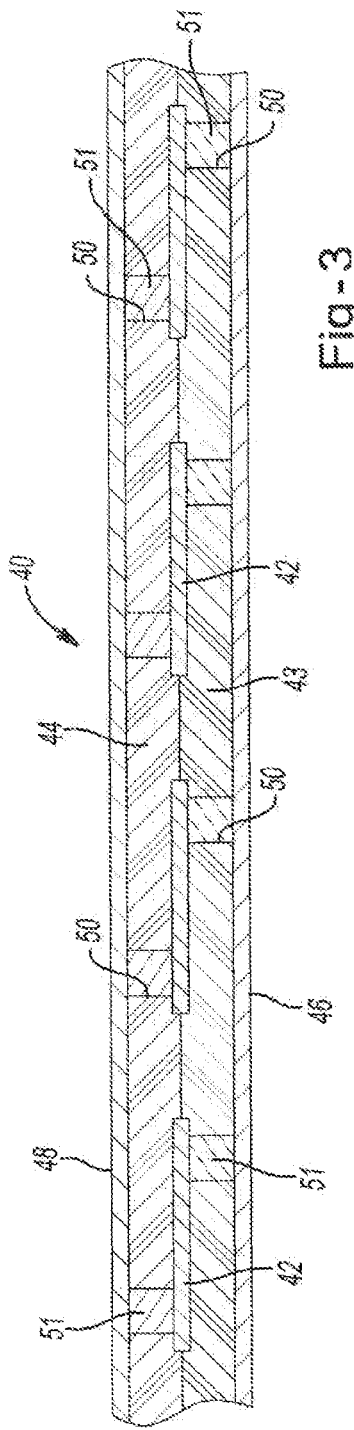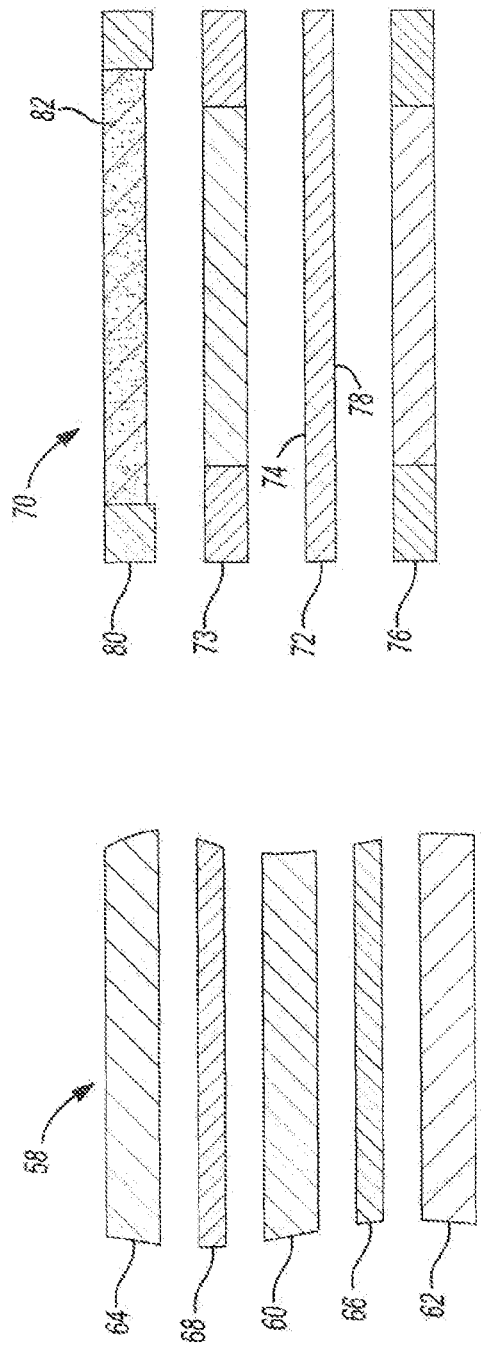

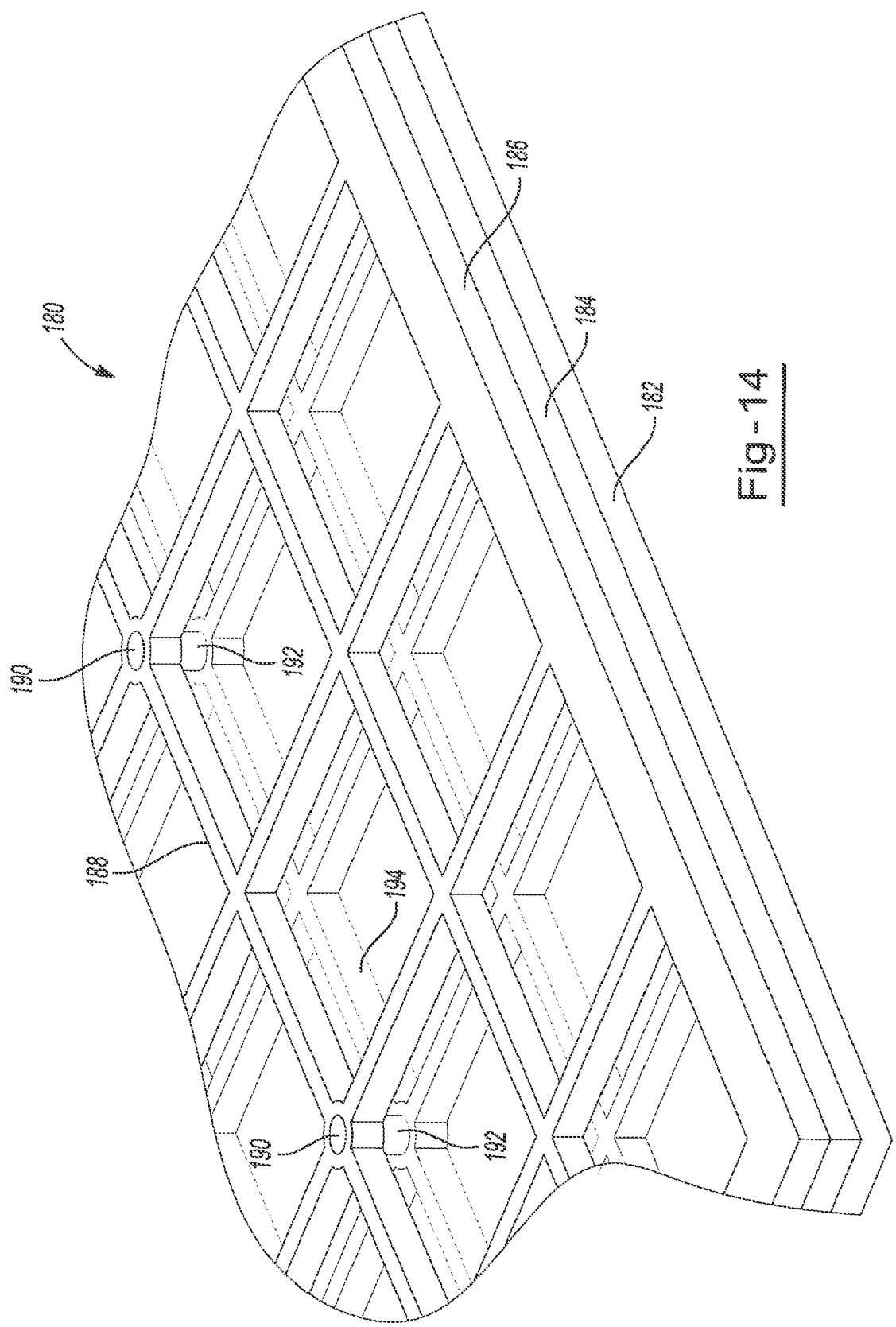

BIPOLAR BATTERY ASSEMBLY

CLAIM OF PRIORITY

This application claims the benefit of the filing date of U.S. Provisional Application Ser. No. 61/146,270 filed on Jan. 21, 2009, the entirety of the contents of that application being hereby expressly incorporated by reference.

FIELD OF THE INVENTION

The inventions disclosed and illustrated herein relate generally to batteries, and more particularly to bipolar lead-acid battery devices.

BACKGROUND OF THE INVENTION

While there has been considerable study and development of alternative battery materials, the lead-acid battery is still the most common choice for many operations requiring rechargeable battery power, particularly when high current capacities are sought. A conventional lead-acid battery is commonly a multi-cell structure where each cell includes a set of interdigitated monopolar positive and negative plates formed of lead or lead-alloy grids containing one or more layers of electrochemically active pastes or active materials. Positive and negative plates will generally share a common separator between them to help prevent short circuits.

The paste on the positive electrode plate will generally include a material that provides lead dioxide ($PbO_2$), when charged, which can serve as the positive active material. The negative plate contains a negative active material such as sponge lead. An acid electrolyte such as sulfuric acid is interposed between the positive and negative plates.

Traditional lead-acid batteries use heavy metal lead in constructing the plates. Consequently, as power requirements increase (thus increasing the number of plates required), the batteries become extremely heavy making them ineffective for use in applications where weight reduction is vital, such as the aircraft, electric car and vehicle fields. In an effort to resolve the weight issues related to the use of heavy lead plates, thinner plates have been developed from lighter weight materials used in place of and in combination with lead. The use of thinner, lightweight plates creates the opportunity to increase the number of plates thereby improving the power density of a lead-acid battery. However, the extent to which conventional battery performance can be improved upon is limited, as their power and energy densities are restricted by their construction.

To overcome these construction limitations of conventional lead-acid batteries, bipolar batteries have been developed that offer the potential for improvement over monopolar battery technology. Unlike conventional lead-acid battery construction, bipolar battery construction comprises a collection of electrode plates that each contain a negative active material on one side and a positive active material on the other side, hence the terms "bipolar" and "biplate". The biplates generally are serially arranged in such a fashion that the positive side of one plate is directed toward the negative side of an opposing plate. The bipolar battery is made up of separate electrolytic cells that are defined by biplates of opposing polarities. The biplates are electrically conductive to provide a serial connection between cells.

The biplates are typically regarded as capable of providing for improved current flow over that of conventional monopolar batteries. The enhanced current flow is believed to be the result of through-plate current transfer from one polarity of the biplate to the other. That is, in a conventional monopolar battery, the current must travel from one electrode plate to another of opposite polarity via a conductive path, which commonly is circuitous and of relatively considerable length. The significantly shortened intercell current path of a bipolar battery can thereby reduce the internal resistance of the battery, making it more efficient than the conventional monopolar battery in both discharging and charging modes of operation. Accordingly, ability to reduce internal resistance permits for the construction of a bipolar battery that is both smaller and lighter than its equivalent monopolar battery, making it a highly desirable alternative for use in the aircraft, military and electric vehicle industry where considerations of size, weight or both are of major importance.

The bipolar battery, however, is not without its own difficulties and problems. A first such difficulty involves thermal temperature control within the battery and the related desire to be able to control the temperature within the battery to produce optimum battery operating efficiency. Another related issue involves the desire to discontinue the flow of electricity, effectively shutting down the battery, when the battery is operating at undesirable temperature conditions, thereby helping to avoid a potentially hazardous condition.

Also, previous bipolar battery constructions have consistently used bulky end plates secured by cumbersome external structures to ensure no edge seal ruptures. Such bipolar batteries are generally not scalable as the thickness of the endplate must increase with larger bipolar plate size to keep end-seal ruptures and subsequent leaking from occurring. As a result, bipolar batteries have generally been practically limited to small capacities to maintain high energy densities.

Other considerations commonly relating to bipolar battery design include the ongoing desire to improve battery efficiency by one or more modifications for increasing energy production, reducing weight, reducing overall construction size, improving construction design to support internal compressive loads, reducing construction materials, or reducing assembly operations.

U.S. Pat. No. 4,275,130 discloses a bipolar lead acid battery construction that includes a biplate of conductive thermoplastic material, a separator plate adapted to carry active material, and means for containing and maintaining the active material and conductive biplate in operable assembly and electrical contact. The teachings do not appear to discuss any battery assemblies that address temperature considerations.

U.S. Pat. No. 4,510,219 discloses a lead-acid battery plate construction for use in monopolar or bipolar batteries. The plates described therein include a glass fiber sheet having a particulate tin oxide coating. The teachings of that patent do not appear directed at addressing battery temperature considerations.

U.S. Pat. No. 4,658,499 discloses a bipolar battery plate that includes metal pellets embedded in a perforated thermoplastic sheet. The disclosed thermoplastic materials are described as having a melting point below the melting point of lead, as the preferred metal pellet material. However, the teachings of that patent do not appear directed at addressing battery temperature considerations U.S. Pat. No. 5,585,209 describes a bipolar battery plate including a titanium core surface as a means to prevent corrosion. While the preferred materials are described as promoting temperature stability within the battery, the teachings of that patent do not appear directed at addressing an automatically controlled shut-off in the event that temperatures within the battery exceed a predetermined threshold.

U.S. Pat. No. 5,593,797 describes a bipolar battery electrode having an improved electrolyte-tight seal. While disclosing the use of conductive materials in the form of fibers or pellets within the electrode core member, the teachings of that patent likewise do not appear directed at addressing an automatically controlled shut-off in the event that temperatures within the battery exceed a predetermined threshold.

U.S. Patent Publication No. 2004/0072074 discloses a bipolar battery electrode that is described as being substantially pore-free. The electrode is further described as including an uncured epoxy in combination with a titanium powder. Among other shortcomings in the teachings, the teachings of that patent likewise do not appear directed temperature control features.

Accordingly, notwithstanding the efforts in the art, until the present teachings, there has been an ongoing and continued need for a battery, more particularly a lead-acid battery, and still more particularly bipolar lead acid battery that is constructed in a manner that provides improvements over conventional bipolar battery technology in one or more of the following areas: temperature control; high-temperature shut down; increased energy production; reduced weight, reduced overall construction size, improved construction design to support internal compressive loads; reduced construction materials or reduced assembly operations.

SUMMARY OF THE INVENTION

The present teachings, by and through its various aspects, are able to meet one or any combination of the above needs by providing methods and structures for realizing an improved battery construction. Without intending to be limiting, among the various features of the present teachings that make such battery construction so attractive is that a robust battery can be realized by the employment of a unique pasting frame structure, by which paste may be applied to or employed in the substrates in a manner so that the appropriate desired electric conductivity can be achieved across the substrate, while also preserving a means suitable for battery shut-down in the event a predetermined temperature condition is met, and further by which adjoining plates can be suitably employed and maintained in spaced opposing relation to each other so that the internal structure creates an external seal such that no additional external structures or devices are required to seal the battery for leakage prevention.

Thus, in one aspect, the present teachings contemplate a method of making a bipolar battery assembly comprising the steps of providing a substrate, forming openings in the substrate, filling the openings with an electrically conductive material, covering the substrate with first and second current collector sheets and first and second non-conductive pasting frame members. The electrically conductive material may be an admixture that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path.

The first current collector sheet may cover the substrate and may function as a negative current collector in a first cell of the battery on the first surface of the substrate. The second current collector sheet may function as a positive current collector in a second cell of the battery on the second surface of the substrate. The first current collector sheet and the second current collector sheet may be disposed so that the electrically conductive material and the substrate is sandwiched therebetween.

The first non-conductive pasting frame member may be positioned on the first current collector sheet in planar contact with an edge of the substrate thereby creating a leak-proof seal along the exterior of the battery; and the second non-conductive pasting frame member may be positioned on the second current collector sheet in planar contact with an edge of the substrate.

The substrate may include cooling channels embedded in the substrate. The cooling channels may run parallel to the face of the substrate. Further, the cooling channels may be arranged so that they do not intersect with the openings in the substrate. The cooling channels may also extend through the substrate, the pasting frame members and the separator frame so that a cooling conduit is formed that extends through the battery. The pasting frame members may also include one or more support members so that the effective distance between the edges of the battery component is reduced.

One or more adhesive layers may also be included. An adhesive layer may be placed between the substrate and each of the positive and negative collector foils. An adhesive layer may also be placed between each of the positive and negative collector foils and their respective positive and negative non-conductive pasting frame members.

The electrically conductive material may have a melting point so that when the battery experiences temperatures above that melting point, the electrically conductive, material will fail to fill, the plurality of openings. Any unfilled openings in the substrate may cause an open circuit within the battery component. Any unfilled openings in the substrate may cause increased resistance within the battery component. Any unfilled openings in the substrate may cause battery failure. The substrate itself may have a heat distortion temperature that is sufficient to withstand any melting of the electrically conductive material that may occur.

Another aspect of the present teachings contemplates unique structures for a bipolar battery laminate structure, such as structures derived from the above methods. The structures, whether from the above methods or not generally comprise a first separator frame; a negative pasting frame member having one or more edges and a supporting grid structure extending between the one or more negative pasting frame edges; a negative current collector foil; a substrate having a plurality of openings formed therein; a positive current collector foil; a positive pasting frame member having one or more edges and a supporting grid structure extending between the one or more positive pasting frame edges and a second separator frame.

The first separator frame may include one or more edges. The negative pasting frame member may have one or more edges so that at least one edge of the negative pasting frame member is in planar contact with at least one edge of the separator frame. The substrate may also have one or more edges so that at least one edge of the substrate is in planar contact with at least one edge of the negative pasting frame member. The positive pasting frame member may have one or more edges so that at least one edge of the positive pasting frame member is in planar contact with at least one edge of the substrate. The second separator frame may have one or more edges so that at least one edge of the separator frame is in planar contact with at least one edge of the positive pasting frame member. The planar contact of the edges of the separator frames, the negative and positive pasting frame members and the substrate form an external seal on the battery so that an electrolyte introduced therein will not leak from within the battery. The edges of the pasting frame members may further include openings for receiving alignment pins or support members located on the edges of the separator frames. The locating of the alignment pins into the openings on the pasting frame members may further facilitate the forming of the external seal.

DESCRIPTION OF THE DRAWINGS

The above-mentioned and other features of bipolar battery constructions are set forth in the following detailed description of the present invention, which description is presented with reference to the accompanying drawings identified below.

FIG. 3 is a cross-section view of a substrate useful for making an electrode plate assembly constructed in accordance with the present teachings.

FIG. 4 is an exploded view of multiple material layers useful for making an electrode plate assembly constructed in accordance with the present teachings.

FIG. 5 is an exploded view of multiple frame members useful for making an electrode plate assembly constructed in accordance with the present teachings.

FIG. 14 is an enlarged view of a section taken from the frame member assembly, of FIG. 13.

DETAILED DESCRIPTION

Figure 1:
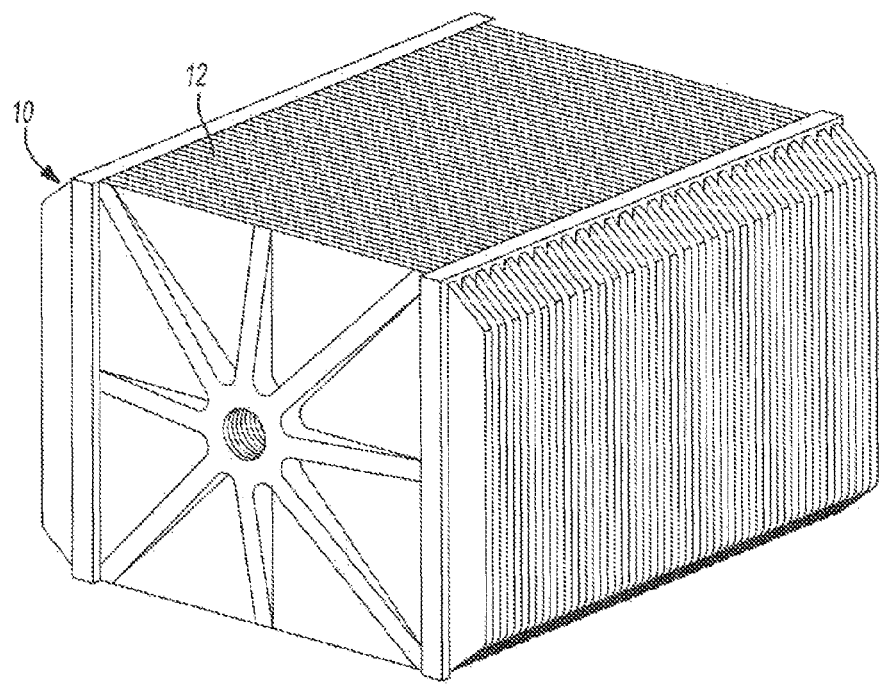
FIG. 1 is a perspective view of a bipolar battery constructed in accordance with the present teachings.

The bipolar battery constructions and materials disclosed herein provide a number of desired benefits which may include but are not limited to temperature control; high-temperature shut down; increased energy production; reduced weight; reduced overall construction size; improved construction design to support internal compressive loads; and/or reduced construction material and assembly costs. These benefits are achieved through a method for making bipolar battery components that includes providing a dielectric substrate, forming openings in that substrate and filling those openings with an electrically conductive material admixture that undergoes a phase transformation (e.g., it chemically reacts or otherwise physically transforms from a generally self-supporting and/or hardened or state (e.g., a solid, relatively highly viscous body (such as a paste)), to a fluid such as a liquid and/or a gas) at a temperature that is below the thermal degradation temperature of the substrate (e.g., a temperature at which the material of the substrate undergoes a phase transformation that renders it as an unstable physical barrier between cells, or otherwise renders it unsuitable for functioning as a cell separator).

The electrically conductive material admixture thus is such that at an operating temperature of the battery assembly that is below its phase transformation temperature, the dielectric substrate has an electrically conductive path via the material admixture, between a first surface and an opposing second surface of the substrate, and at a temperature that is above the phase transformation temperature of the conductive material admixture, the electrically conductive material admixture undergoes a phase transformation that disables electrical conductivity via the electrically conductive path.

It also is envisioned that a unique frame structure may be used by which one or more separator frames and one or more pasting frames, in combination with the substrate, will each lie in planar contact with adjacent frames and/or substrates so that the internal, structure of the battery cell creates an external seal that prevents any liquid or air from escaping the battery. The edges of the pasting frame members may further include openings for receiving alignment pins or support members located on the edges of the separator frames. The locating of the alignment pins into the openings on the pasting frame members may further facilitate the forming of the external seal. Thus, any electrolyte introduced into the battery will be securely maintained without risk of battery leakage and subsequent battery failure. Further, no heavy end plates or external support structures are required to effectively seal the battery.

As mentioned above, the pasting frame members may further include support members (e.g., pins) located between the edges of the pasting frame members. The use of support members is just one approach to address the issue of compressive stress and resulting unwanted edge/peeling stress within the battery. These stresses may lead to undesirable battery leakage as discussed above. This use of the support pins within a battery, and the resulting internal approach discussed herein, may therefore be referred to as building a bipolar battery having an endo-skeleton.

A feature of using the endo-skeleton build or construction approach (as compared to using an exo-skeleton build approach) to address the undesired effects of compressive stress within the battery, is that it does not result in a reduction of volumetric energy density. Additionally, it is a lightweight approach, using only a few lightweight pins with very little loss of active material. Further, the endo-skeleton build approach has been found to greatly reduce the chances of traditional bipolar battery failure mode caused by edge peeling. Further, if desired, one can add pins on the perimeter or edge of the frame members to align the separating frame member, thereby allowing it to glide up and down or back and forth during compression.

If desired, the bipolar battery may be constructed using a combination of an endo-skeleton and exo-skeleton build approach. For example, the bipolar battery can be constructed using internal support pins as described above. In addition to this, a frame structure may also be placed on the terminal side of the monopole. This exterior battery construction may be reinforced with an end cover as part of an aesthetic box. The combined features of an endo-skeleton and an exo-skeleton in such a construction work together to further reduce maximum edge stress and displacement. The bipolar battery may also be substantially free of any exo-skeleton structure.

The construction of a conventional bipolar battery involves the placement of an electrically conductive substrate as an inter-cell partition between adjacent cells of the battery such that separation of the electrolyte in the respective cells is maintained by the conductive substrate. Positive active material (e.g., in the form of a sheet such as a foil) is applied to one side of the substrate, while negative active material (e.g., in the form of a sheet such as a foil) is applied to the opposite side of the substrate. The positive active material is exposed to the electrolyte of one cell and the negative active material is exposed to the electrolyte of the adjacent cell. The conductive substrate thereby forms a single structure electrically connecting two adjacent half cells, one positive and one negative. The substrate generally also will function as a supporting structure to enable collecting and transmitting current for active materials between adjacent cells.

The substrate structure used between the cells and to which the active materials are applied may be any suitable structure. It may be a composite structure that includes at least one non-electrically conductive material and at least one electrically conductive material (e.g., a conductive material that is applied in the form of a paste in holes formed in a dielectric substrate) that provides a substantially continuous conductive flow path. For example, it may provide a conductive flow path that is substantially free of any voids, fissures or other holes or interfering non-conductive material between opposing sides of the substrate.

A substrate can be sealed at least partially, if not entirely, about its perimeter to preclude contact between the electrolyte of adjacent cells.

In general, the teachings herein contemplate that the substrate will be employed in combination with the positive and negative active material of a bipolar battery cell in a manner such that it performs one or any combination (e.g., all) of: (1) participating in the electrochemical reaction causing the evolution of free electrons, (2) serving as a cell partition, preventing the migration of electrolyte between adjacent cells, (3) intimately and effectively supporting the relevant active materials of a battery cell, (4) conducting electricity as efficiently as possible, or (5) cooperating with other battery components to form an electrolyte-tight seal about the biplate edges which may be on the outside surface of the battery.

The substrate can be formed from a variety of materials depending on the function of the battery chemistry. The substrate may be formed from materials that are sufficiently structurally robust to provide the backbone of a desired bipolar electrode plate. The substrate may be formed from suitable materials and/or is configured in a manner that permits the transmission of electricity from one surface of the substrate to an opposite substrate surface. The substrate plate may be formed from an electrically conductive material, e.g., a metallic material, or can be formed from an electrically non-conductive material, e.g., a polymeric or plastic material, but having electrically conductive features constructed therein or thereon.

The substrate may be formed from an electrically non-conductive material, e.g., a polymeric or plastic material, having a desired degree of structural rigidity. Further, the substrate may be formed of a material capable of withstanding temperatures that exceed the melting points of any conductive materials used in the battery construction. The substrate may also be composed of material having high chemical stability during contact with an electrolyte (e.g., sulfuric acid solution) so that the substrate does not degrade upon contact with an electrolyte. The substrate may be formed of a polymeric material including but not limited to thermoplastics, thermoset plastics, elastomeric containing materials or any combination thereof. Examples of polymeric materials that may be employed include polyamide, polyester, polystyrene, polyethylene (including polyethylene terephthlate, high density polyethylene and low density polyethylene), polypropylene, polyvinyl chloride, bio-based plastics/biopolymers (e.g., polylactic acid), silicone, acrylonitrile butadiene styrene (ABS), or any combination thereof. As an example, the heat distortion temperature of a substrate formed from ABS is sufficient to withstand a solder reflow process although the temperature of said reflow process is substantially higher than the glass transition temperature of the plastic substrate.

As indicated, one possible approach is to employ a composite substrate, and more particularly a generally non-electrically conductive substrate (e.g., a dielectric substrate) that includes one or more openings formed therein. The openings may be machined (e.g., milled), formed during fabrication of the substrate (e.g., by a molding or shaping operation), or otherwise fabricated.

The size and frequency of the openings formed in the substrate may affect the resistivity of the battery. The openings may be formed having a diameter of at least about 0.2 mm. The openings may be formed having a diameter of less than about 5 mm. The openings may be formed having a diameter from about 1.4 mm to about 1.8 mm. The openings may be formed having a density of at least about 0.02 openings per $cm^2$. The openings may be formed having a density of less than about 4 openings per $cm^2$. The openings may be formed having a density from about 2.0 openings per $cm^2$ to about 2.8 openings per $cm^2$.

The openings may be filled with an electrically conductive material, e.g., a metallic-containing material. For instance, the electrically conductive material may be or include a solder material, e.g., one comprising at least one or a mixture of any two or more of lead, tin, nickel, zinc, lithium, antimony, copper, bismuth, indium, or silver. Examples of solder materials that may be used include but are not limited to Sn—Ag—Cu (e.g., $SnAg_{3.0}Cu_{0.5}$, $SnAg_{3.5}Cu_{0.7}$, $SnAg_{3.5}Cu_{0.9}$, $SnAg_{3.8}Cu_{0.7}$, $SnAg_{3.8}Cu_{0.7}Sb_{0.25}$, and/or $SnAg_{3.9}Cu_{0.6}$), $SnCu_{0.7}$, $SnZn_9$, $SnZn_9Bi_3$, $SnSb_5$, $SnAg_{2.5}Cu_{0.8}Sb_{0.5}$. $SnIn_{8.0}Ag_{3.5}Bi_{0.5}$, $SnBi_{57}Ag_1$, $SnBi_{58}$, $SnIn_{52}$, and combinations thereof. The electrically conductive material may be substantially free of any lead (i.e., it contains at most trace amounts of lead) or it may include lead in a functionally operative amount.

The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., 230° C., 220° C., 210° C. or even below about 200° C. (e.g., in the range of about 180 to about 190° C.). The material may include a eutectic mixture.

A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the electrode plate. An open circuit may operate to dramatically increase the resistance within the bipolar battery thereby stopping further electrical flow and shutting down unsafe reactions within the battery. Accordingly, the type of electrically conductive material selected fill the openings can vary depending on whether it is desired to include such an internal shut down mechanism within the battery, and if so at what temperature it is desired to effect such an internal shutdown.

One of the unique aspects of the present teachings contemplates that the substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled.

Yet another unique feature of the present teachings is the employment of frame structures that function to form an internal support structure that effectively produces an external seal about the battery, thereby allowing any electrolyte to be maintained within the cells with no edge peel or leakage. This internal support structure further reduces the need for any bulky end plates or external structures traditionally used to seal the battery. Without the need for these end plates or external structures, the number of cells used to create a battery is not limited by size and weight considerations, thus many more cells can be combined to create more power without requiring more weight and size to seal the batteries.

The assembly may include one or more pasting frame members, separating frame members or both. By way of illustration, a separating frame member may be positioned adjacent the positive pasting frame member. The separating frame member may operate to both separate the positive pasting frame member of one electrode assembly from the negative pasting frame member of an adjacent electrode assembly. The separating frame member may also provide a contained chamber for accommodating a desired volume of electrolyte therebetween. The separating frame member may be formed from a structurally rigid electrically nonconductive material capable of performing within a lead-acid battery environment at operating temperatures without presenting edge peel or leakage issues. The separating frame member and pasting frame members may be composed of polymeric materials including but not limited to thermoplastics, thermoset plastics, elastomeric containing materials or any combination thereof.

The positive and negative pasting frame members may comprise a generally rigid frame with an open inner section that is provided to accommodate a volume of respective positive-side and negative side active material. The positive and negative pasting frame members may be formed from electrically nonconductive materials capable of performing within a lead-acid battery environment at operating temperatures without presenting leakage issues. The active materials placed within the confines of the pasting frame members include those positive and negative active materials used to form electrode surfaces in conventional bipolar batteries. For termination purposes, the negative pasting frame member may be omitted from a terminating electrode assembly for the formation of a positive terminal, and the positive pasting frame member would be omitted from a terminating electrode assembly for the formation of a negative terminal.

The battery constructions disclosed herein may also include attachments and/or support members in an effort to prevent stress-related peeling issues common to conventional bipolar batteries. Stress-related peeling issues have somewhat limited the construction of bipolar batteries of larger size and power as there are stresses placed on the battery end plates due to the compression after the battery is assembled. The battery construction may comprise a number of support members or pins that extend between the rigid base and the end plate.

The pins may be positioned within the construction between the inside edges of the separating frame member to thereby reduce the effective distance between the edges within the construction. The pins may also reduce both the amount of maximum edge stress and end plate displacement. The placement of the pins may thus reduce the occurrence of unwanted peeling within the battery due to the effect of compressive stresses. The edges of the pasting frame members may further include openings for receiving alignment pins or support members located on the edges of the separator frames. The locating of the alignment pins into the openings on the pasting frame members may further facilitate the forming of an external seal.

The pasting frame members may also include a supporting grid structure extending between the frame member edges wherein the grid structure includes a number of openings or holes extending through the grid structure to accommodate placement of support pins therethrough.

FIG. 1 illustrates an example of a bipolar battery 10 constructed according to principles of the present teachings comprising a number of electrode plates 12 or biplates, stacked (e.g., in serial fashion) from the front to the rear (or otherwise in an arrange spanning at least partially, if not fully across the battery). The number and configuration of the biplates may be selected as desired to define both the length and the cross-sectional shape of the battery.

FIG. 1 illustrates an embodiment of the bipolar battery with biplates shaped in the configuration of a square or rectangle, but other plate configurations, such as a circle, oval, hexagon and the like, can be used if desired.

Figure 2:
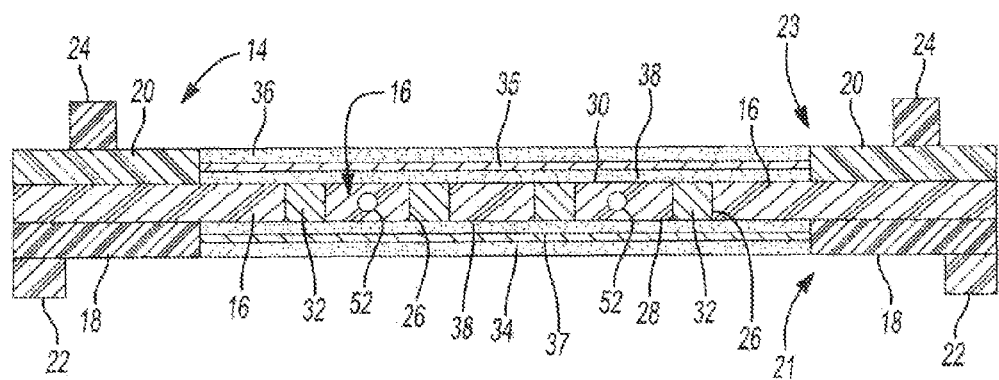
FIG. 2 is a cross-sectional view of an electrode plate assembly constructed in accordance with the present teachings.

As shown for example in FIG. 2, an electrode plate assembly 14 comprises a substrate 16 that is located between pasting frame members 18 and 20. Separating frame members 22 and 24 are placed in contact with respective pasting frame members 18 and 20. The positive and negative pasting frame members may comprise a generally rigid frame 18, 20 with an open inner section 21, 23 that is provided to accommodate a volume of respective positive-side active material 34 and negative side active material 36.

As depicted for example in FIG. 2, the substrate may include a number of openings 26, holes or channels formed in the substrate and extending through the thickness of the substrate between opposite surfaces 28 and 30. The number and size of the openings 26 are sufficient to permit a desired flow of electricity through the substrate plate between the surfaces 28 and 30 during battery operation.

As shown in FIG. 2, the substrate surfaces 28 and 30 may include an electrically conductive material layer 35 and 37 respectively disposed thereon. The conductive material layers 35 and 37 may be provided in the form of a metallic foil. A preferred metallic material useful for forming the conductive material layers is one formed from lead. The metal foils may be attached to the substrate by a suitable adhesive 38 capable of maintaining, attachment of the foil layers to the adjacent substrate surfaces during battery operation. As noted above, during high operating temperatures sufficient to cause melting of the solder within the openings 26, the solder or other suitable conductive material diffuses in the material layers 35 and 37 leaving the openings devoid of an electrically conductive material to promote the desired open circuit condition.

The electrode assembly 14 may also be impermeable to any unwanted leakage of electrolyte between cells. Thus, it is desired that the conductive material 32 used to fill the plurality of openings 26 through the substrate plate 16 completely fill the openings in such a manner so as to avoid any unwanted leakage of electrolyte therein. The conductive material layers 35 and 37 over the substrate plate surfaces may also operate to prevent unwanted electrolyte leakage through the plate. While it is possible that a defect in a material layer could cause leakage of electrolyte, the defect would have to be aligned with an opening through the substrate. Further, the electrically conductive material in that particular opening would have to fail to fill the opening in order for such a defect to case leakage through the electrode assembly.

FIG. 3 illustrates an additional example substrate 40 comprising an electrically conductive interconnect layer 42 disposed internally within the substrate between the substrate layers 43 and 44, wherein the outer surfaces of the substrate layers are in contact with the electrically conductive material layers 46 and 48, respectively. The interconnect layer 42 may be formed from an electrically conductive material, e.g., a metallic material, and is located between two opposing substrate laminate layers that are bonded to one another. The substrate layers 43 and 44 can be formed from those materials described above for the substrate.

As further illustrated in FIG. 3, the interconnect layer 42 permits the openings 50 running from each of the surfaces, and filled with a desired electrically conductive material 51, to be offset from or blind to one another so as to avoid the creation of a continuous fluid leak path through the substrate. While the conductive openings 50 running from each of the surfaces are offset from or blind to one another, they are still useful for transmitting electricity through the substrate by virtue of their connection to the common conductive interconnect layer 42.

While the substrate embodiment illustrated in FIG. 3 demonstrates how the substrate could be constructed to specifically address the issue of electrolyte leak path avoidance, it is understood that other embodiments and/or approaches may be used. For example, an electrode assembly could be formed using more than one substrate placed adjacent one another, and/or by forming a substrate construction having multiple internal layers. Such embodiments are intended to be within the scope of this invention.

Referring back to FIG. 2, substrate plates 14 for making electrode assemblies may also be configured having one or more internal passages 52 disposed therein. The passages 52 can be oriented to run horizontally and/or vertically and/or diagonally within the substrate, and are ideally configured to accommodate the transmission of a cooling medium therein. For example, the substrate 14 can be configured having a plurality of internal passages 52 configured and oriented to accommodate the transmission of a cooling fluid or gas therein.

The presence of such internal cooling passages within the substrate may operate to control the temperature within the battery during operation to thereby promote optimum battery performance. The passages 52 can be connected by an appropriate inlet and outlet, which may be integral with or independent of the substrate. The inlet and outlet may direct the flow of cooling fluid or gas into and out of the multiple electrode assemblies within the battery. Fluid or gas control devices such as valves and the like may be used in association with the cooling passages as needed to provide a desired degree of temperature control to the bipolar battery during both operation and charging. While not shown in FIG. 3, it is understood that such internal cooling passages 52 may be present within the particular substrate 40 presented therein.

FIG. 4 illustrates an example laminate electrode construction 58 comprising multiple construction layers. A feature of such laminate electrode construction is the ability to use different material layers that are individually tailored to provide desired properties of electrical conductivity, impermeability, and corrosion resistance for use within the bipolar battery.

Such laminate electrode construction 58 is placed over each opposed substrate surface and is attached thereto, e.g., by adhesive attachment, and forms an electrically conductive material layer. While electrically conductive material layers having other types of constructions may be used, e.g., being formed from a single layer of material, the use of such a laminate electrode construction 58 provides certain desired advantages. For example, the laminate electrode construction 58 may comprise an inner layer 60 formed from an electrically conductive material having a desired degree of corrosion resistance and improved conductivity. The inner layer 60 may be formed from a copper or copper alloy and may be provided in the form of a foil having a thickness of at least about 0.01 mm. The foil may have a thickness of less than about 1 mm. The thickness of the foil may range from about 0.05 mm to about 0.6 mm.

Outermost layers 62 and 64 may be positioned along opposed surfaces of the inner layer and may also be formed from an electrically conductive material. The outermost layers 62 and 64 may be formed from lead. The outermost layers 62 and 64 may be provided in the form of a foil having a thickness of at least about 0.01 mm. The foil may have a thickness of less than about 1 mm. The thickness of the foil may range from about 0.05 mm to about 0.6 mm. The laminate electrode construction 58 may be arranged so that the outermost layers 62 and 64 are placed and held into contact with the inner layer 60 by use of intermediate layers 66 and 68, respectively. The intermediate layers may be formed from a an electrically conductive material having a relatively low melting point, such as the materials described previously, and the laminate construction may be formed by melting the material between the intermediate layers and pressing the layers together to ensure electrical connection therebetween. The intermediate layers may be formed from an electrically conductive material having a relatively low melting point, such as the materials described previously. By way of example, a lead-tin solder material may be employed such that the layers may be pressed together at a temperature of approximately 200° C. with moderate pressure to form the desired laminate electrode construction 58.

FIG. 5 illustrates an example electrode assembly 70 prepared according to principles of the present invention. The electrode assembly 70 may comprise a bipolar electrode 72 that is constructed having a substrate (as shown in FIGS. 2 and 3) and a laminate electrode construction (as shown in FIG. 4) disposed along the outer surfaces of the substrate. The assembly 70 may further comprise one or more pasting frame members. For example it may include a positive pasting frame member 73 that is positioned adjacent one surface 74 of the electrode 72, and a negative pasting frame member 76 that is positioned adjacent an opposing surface 78 of the electrode 72.

A separating frame member 80 may be positioned adjacent to the positive pasting frame member 73. The separating frame member 80 may operate to both separate the positive pasting frame member of one electrode assembly from the negative pasting frame member of an adjacent electrode assembly. The separating frame member 80 may also provide a contained chamber 82 for accommodating a desired volume of electrolyte therebetween. The separator frame 80 may also provide a displacement stop to ensure correct compression of the separator material such as an absorbent glass mat. The separating frame member 80 may be formed from a structurally rigid electrically nonconductive material capable of performing within a lead-acid battery environment at operating temperatures without presenting leakage issues. The separating frame member and pasting frame members may be composed of polymeric materials including but not limited to thermoplastics, thermoset plastics, elastomeric containing materials or any combination thereof.

Figure 6:
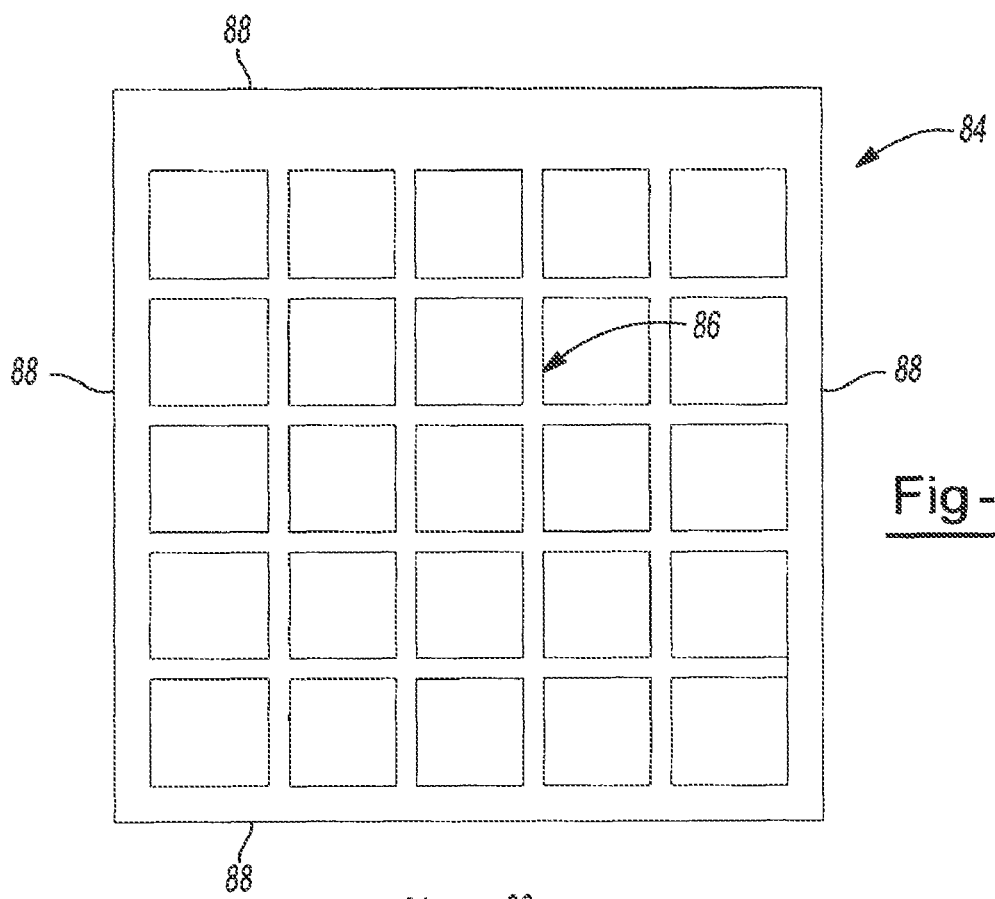
FIG. 6 is a plan view of a frame member useful for making an electrode plate assembly constructed in accordance with the present teachings.

FIG. 6 illustrates an example pasting frame member 84 useful for making electrode assemblies which may include a supporting grid 86 structure positioned between the outer frame edges 88. In this configuration, the supporting grid 86 may be provided to both provide an enhanced degree of structural support to the pasting frame member, and to promote double sided pasting in standard pasting equipment. The supporting grid may provide structural support during the pasting process to prevent bowing and may also improve paste adhesion. Additionally, protective release layers may be attached to an outer surface of the frame edges. Therefore, during, post pasting operations, any active material inadvertently contacted with a frame edge can be easily removed therefrom, leaving behind a clean surface for subsequent frame attachment.

Figure 7:
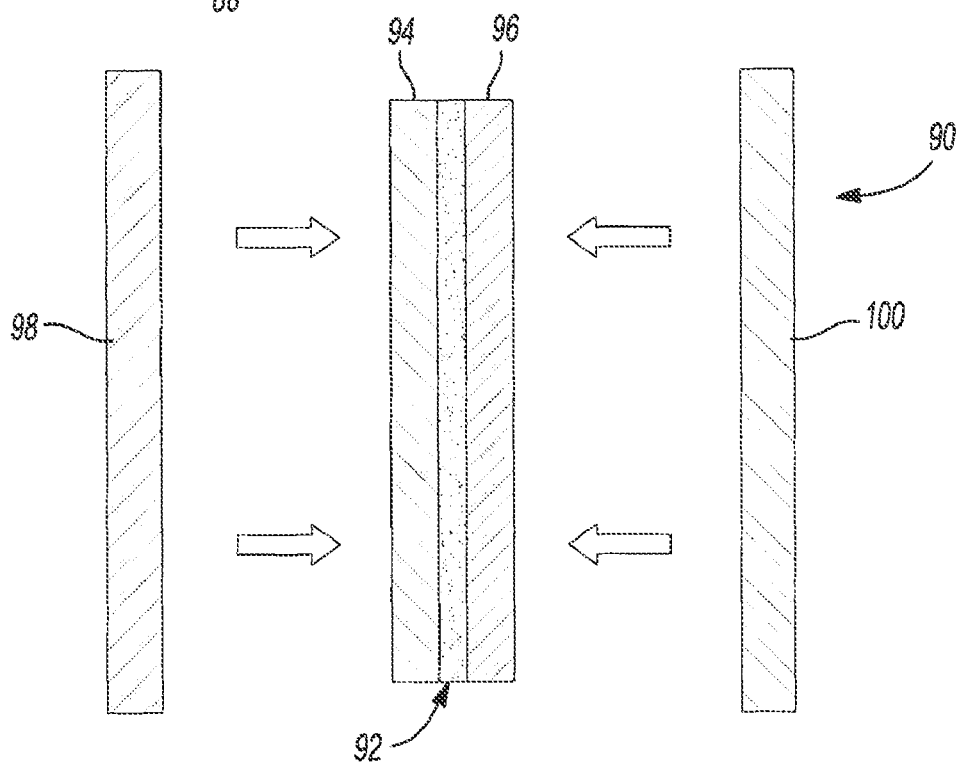
FIG. 7 is an exploded view of the substrate and different frame members useful for making an electrode plate assembly constructed in the present teachings.

FIG. 7 illustrates an electrode plate assembly 90 comprising an electrode 92 (including the substrate member and the outer conductive material layers disposed thereon), positive and negative pasting frame members 94 and 96 positioned onto opposite surfaces of the electrode 92, and separating frame members 98 and 100 attached to respective surfaces of the positive and negative pasting frame members 94 and 96. After pasting and curing the positive and negative pasting frame members 94 and 96, the separating frame members 98 and 100 may be attached thereto. The battery may then be built by stacking the electrode assemblies until the desired number of cells or voltage is achieved. An advantage of this stack-and-assemble method is that the pressure of the battery construction is placed uniformly across each cell, which is important to the performance of valve-regulated, lead-acid batteries.

After assembly, the battery may be filled with electrolyte through ports (not shown) present in the separating frame members. Post filling, a valve (not shown) may be attached to the separating frame member. To facilitate this attachment, the separating frame members may be configured to extend above the positive and negative pasting frame members (as shown in FIG. 7), which also provides additional head space for the electrolyte.

As noted above, electrode assemblies for making bipolar batteries may be configured to accommodate coolant flow therein to promote battery temperature control during normal battery operation and/or during battery charging. Specifically, as described above and as illustrated in FIGS. 2 and 3, electrode assemblies of this invention may include a substrate member having one or more cooling channels disposed therein configured for facilitating the passage of a desired cooling medium therethrough to assist in controlling the internal battery temperature.

Figure 8:
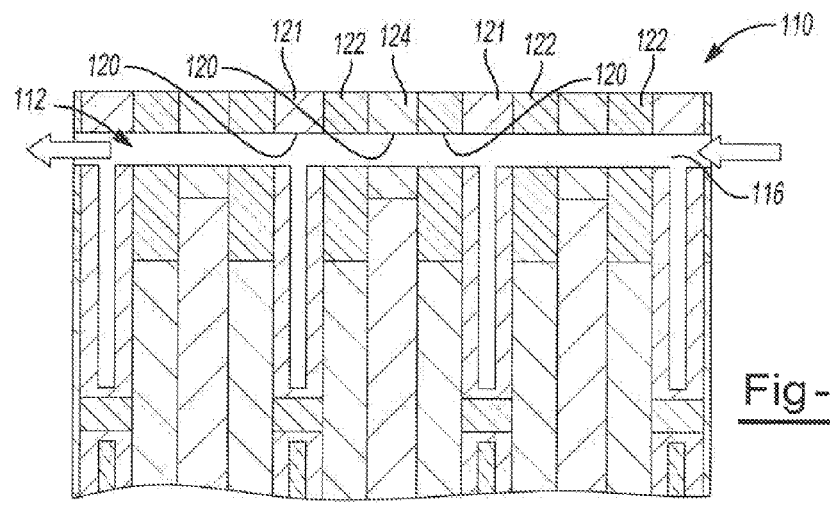
FIG. 8 is a cross-sectional view taken along a section of a bipolar battery constructed in accordance with the present teachings.

FIG. 8 illustrates a sectional view of a bipolar battery 110 having an internal cooling system 112. The cooling system may comprise a cooling fluid or gas inlet and cooling fluid or gas outlet that is in communication with a cooling conduit 116 that extends through a number (e.g., all or a selected number) of the cells making up the battery.

The cooling conduit 116 may extend through all of the cells within the battery, and may be provided in the form of aligned openings 120 that pass through the multiple substrate members 121, pasting frame members 122 and separating frame members 124. The cooling system may be configured to provide single or multi-pass coolant flow through the battery. Additionally, the separate members making up each battery cell can be configured to direct the flow of coolant within the battery in a manner best capable of addressing any unique battery cooling needs based on particular battery configuration and/or battery use.

Figure 9:
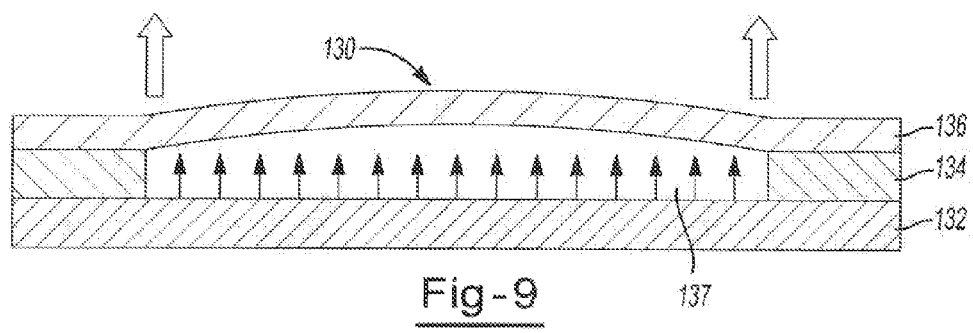
FIG. 9 is a cross-section view of an example of a prior art bipolar battery illustrating end plate deflection caused by internal stresses.

The battery constructions disclosed herein may also include attachments and/or support members in an effort to prevent stress-related peeling issues common to conventional bipolar batteries. By way of illustration, FIG. 9 depicts a conventional bipolar battery construction 130 comprising a rigid base 132, a separating frame member 134, and an end plate 136, wherein the separating frame member 134 is interposed between the rigid base and the end plate, and wherein the separating frame member includes an absorbent glass mat (AGM) 137. The stress-related peeling issues mentioned above have somewhat limited the construction of bipolar batteries of larger size and power as there are stresses placed on the battery end plates 136 due to the compression of the AGM mat 137 after the battery is assembled.

As illustrated in FIG. 9, in conventional bipolar battery constructions, the compression stresses caused by the AGM mat 137 can cause the end plate 136 to bow outwardly, placing maximum stress on the edge of assembly. This stress may produce unwanted internal peeling. Such edge stress has been found sufficient to peel most glues or adhesives used during bipolar battery construction. Any adhesive peeling may result in unwanted leakage of electrolyte from the battery.

Figure 10:
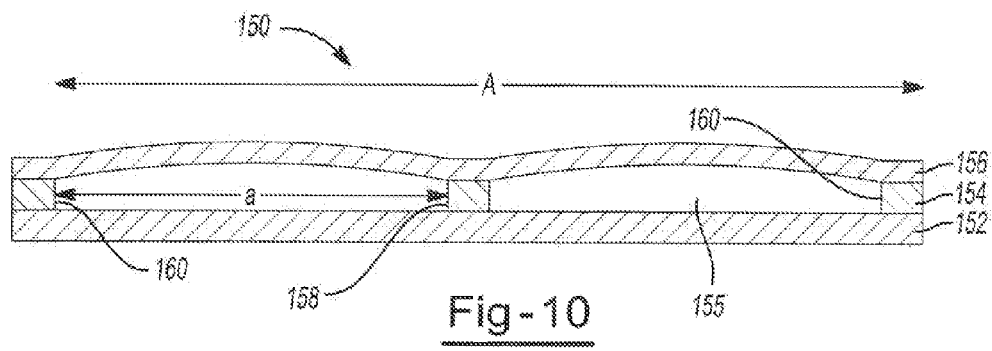
FIG. 10 is a cross-sectional view of a bipolar battery constructed in accordance with the present teachings.

FIG. 10 illustrates a bipolar battery construction 150, prepared according to principles disclosed herein. The battery construction 150 comprises a rigid base 152, a separating frame member 154, and an end plate 156, wherein the separating frame member 154 is interposed between the rigid base 152 and the end plate 156, and an AGM mat 155 is disposed between the rigid base and end plate. A feature of the bipolar battery construction 150 is that it includes a number of support members or pins 158 that extend between the rigid base 152 and, the end plate 156.

As further illustrated in FIG. 10, the pins 158 are positioned within the construction between the inside edges 160 of the separating frame member 154 to thereby reduce the effective distance between the edges within the construction. The pins 158 may also reduce both the amount of maximum edge stress and end plate displacement. The placement of the pins 158 may thus reduce the occurrence of unwanted peeling within the battery due to the effect of compressive stresses.

Figure 11:
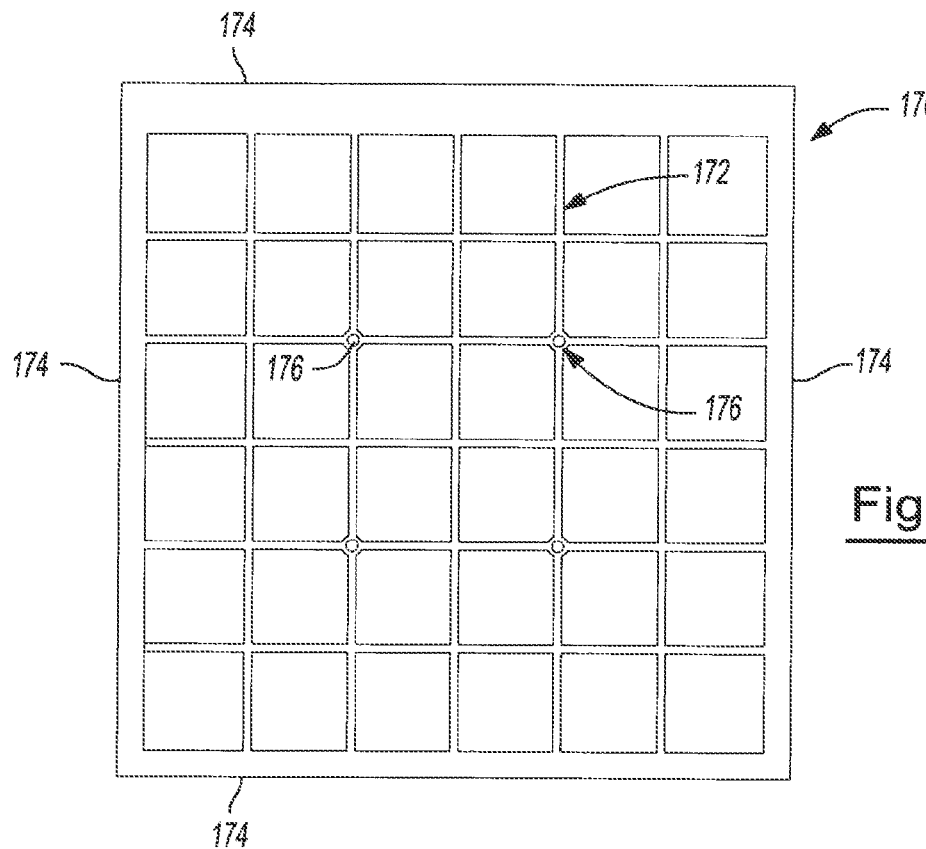
FIG. 11 is a perspective view of a frame member taken from the bipolar battery of FIG. 10.
Figure 12:
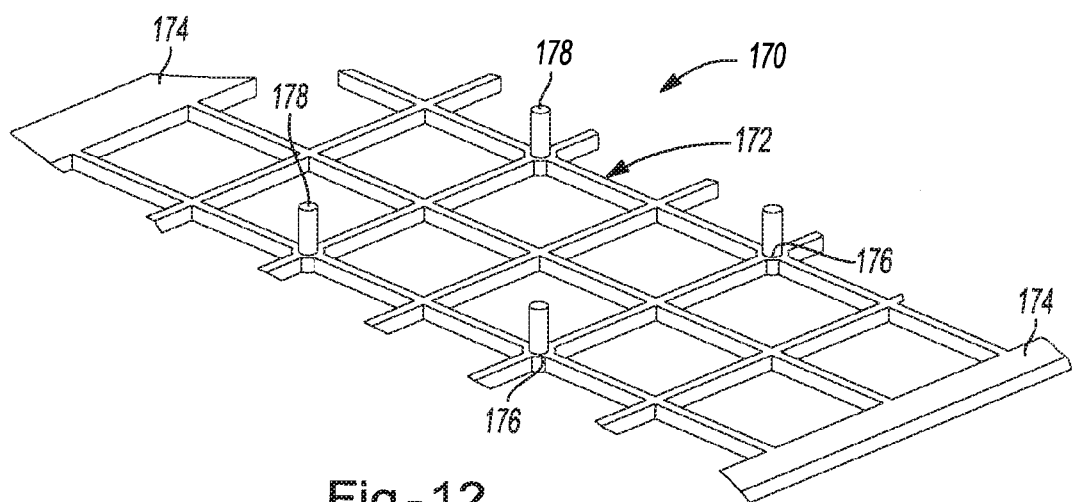
FIG. 12 is a perspective view of the frame member of FIG. 11 as used to form a frame member assembly.

FIGS. 11 and 12 illustrate an example pasting frame member 170 comprising a supporting grid structure 172 extending between the frame member edges 174, wherein the grid structure 172 includes a number of openings or holes 176 extending through the grid structure to accommodate placement of support pins 178 (shown in FIG. 12) therethrough. The support pins 178 may have a length so that they extend between the rigid base and end plate as illustrated in FIG. 10. The support pins 178 may further have a thickness so as to provide a desired level of structural support within the battery.

The support pins 178 may be formed from an electrically nonconductive material, such as plastic or the like, that is both sufficiently rigid to provide a desired degree of support between the rigid battery members within the operating environment of a bipolar battery. For example, the pins are formed from the same types of materials used to form the pasting frame members, and/or the separating frame members.

Figure 13:
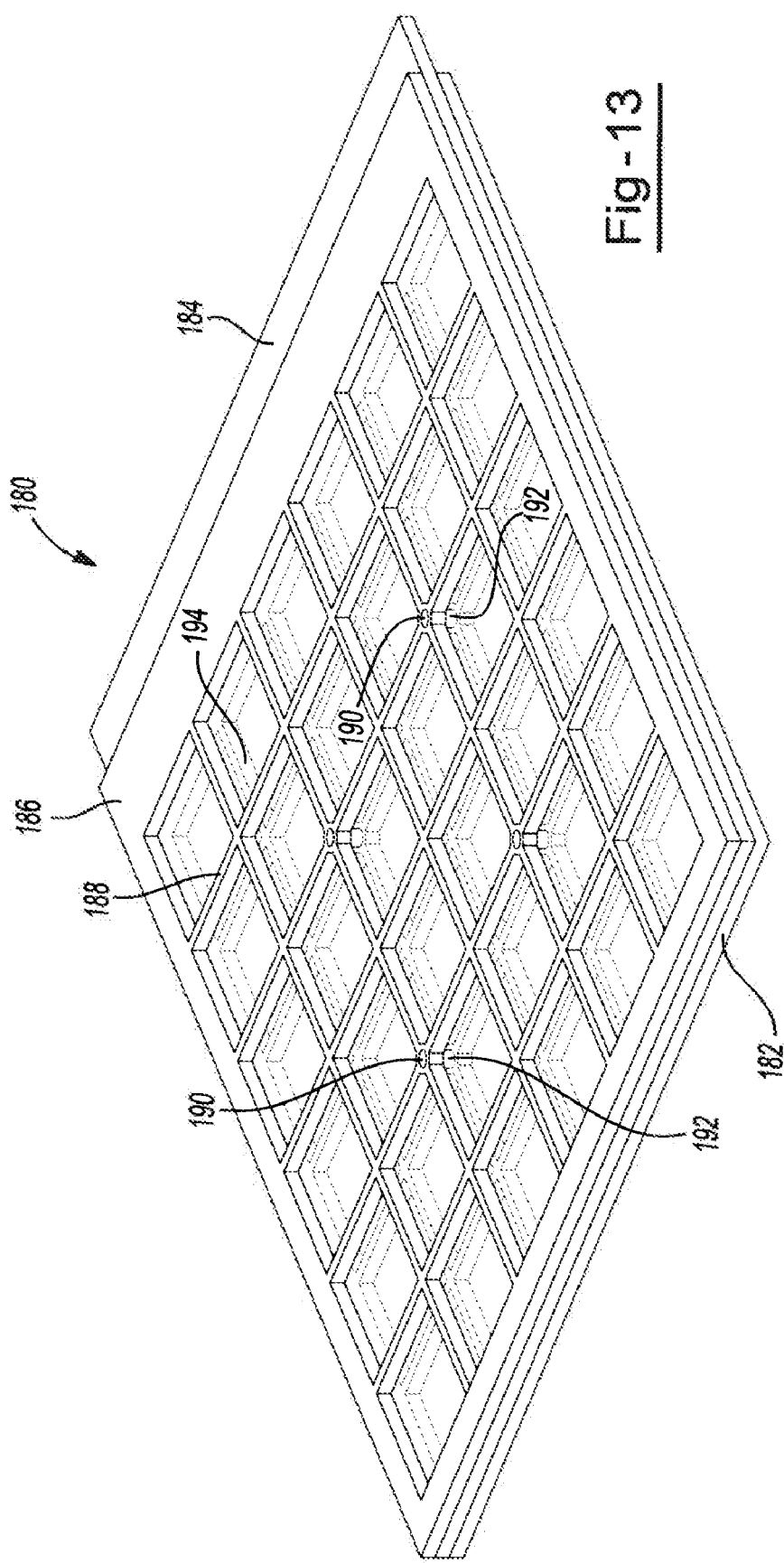
FIG. 13 is a perspective view of the frame member of FIGS. 11 and 12 as used to form an assembly comprising a pair of pasting frame members having a separating frame member interposed therebetween.

FIGS. 13 and 14 illustrate an electrode assembly 180 comprising a positive pasting frame member 182, a separating frame member 184 disposed over the positive pasting frame member 182, and a negative pasting frame member 186 disposed over the separating frame member 184. The negative pasting frame member 186 may be constructed comprising a supporting grid 188 including a number of holes 190 that contain support pins 192 disposed therein.

The support pins 192 may extend outwardly from the negative pasting frame member 186 and may be in contact with an adjacent portion of a supporting grid 194 from the positive pasting frame member 182. The positive pasting frame member supporting grid 194 may or may not include holes to accept placement of the support pins therein. Configured in this manner, the support pins may operate to both maintain a desired spacing between assembly members within the battery, and operate to reduce the internal edge stress existing within the battery as noted above. FIG. 14 illustrates a placement of the support pins 192 extending between the positive and negative pasting frame members 182 and 186.

It is to be understood that the exact placement, size and number of support pins used to construct a bipolar battery may vary depending on the particular size, configuration and/or application of the battery, and such variance is intended to be within the scope of the invention. Further, while the support members have been described as being pins, it is to be understood that the support members can take on a variety of different shapes or configurations that are capable of performing the function noted above, and that such different shapes and configurations are understood to be within the scope of the invention.

An example construction of the bipolar batteries described herein is described in Example 1. More generally, a substrate may be provided. It may be cut into an appropriate size and/or shape. A plurality of holes may be formed in a dielectric polymeric substrate. The substrate may be cleaned. Electrically conductive material may be applied to fill the holes. For example, it may be printed, sprayed, spread, evaporated, electroplated, or deposited by any similar deposition process. A sheet (e.g., a metal foil) is applied over each side of the substrate. It may be rolled or otherwise smoothed. The sheet may be adhered to the substrate via any suitable adhesive. Heat and/or pressure is applied for bonding the sheet to the substrate and the electrically conductive material therein. The heat may be applied at a temperature of at least about 80° C. The heat may be applied at a temperature less than about 475° C. The pressure may be applied at greater than about 30 PSI. The pressure applied may be less than about 300 PSI. No pressure may be applied in some constructions. The resulting biplates may undergo oven heating at temperatures from about 50° C. to about 200° C. The oven heating may be at any temperature sufficient to cure any adhesive used in the construction. The pasting frames may then be attached to both sides of the biplates via an adhesive.

The biplates may be covered with a paste that may be a lead-containing paste. The paste may be lead oxide paste. The biplates may also be oven-cured after pasting. The biplates may then be assembled to form a battery. The battery assembly may include a negative monopole, a positive monopole, and a plurality of biplates therebetween. One or more separator frames may be placed between the monopoles and biplates. The separator frames may also include one or more support structures. One or more mat separator materials (e.g., absorbent glass mats) may be placed in each separator frame. An adhesive (e.g., a plastic cement) may be applied to each separator frame. The plates may then be stacked and cured. The assembled battery may then be contacted with an electrolyte (e.g., sulfuric acid solution). Once filled, the fill ports may be sealed with an adhesive.

Example 1

Bipolar Electrode with Epoxy Laminate Substrate

Epoxy laminate, FR4 Micarta® board (available from Norplex Micarta, Postville, Iowa) is used as the substrate material. The substrate is 0.8 mm thick and cut to 197×166 mm. Seven hundred and twenty (720) 1.6 mm diameter holes 6.25 mm on center are milled into the substrate. The samples are lightly sanded on both faces and washed with isopropyl alcohol. A rubber-based, thermoset adhesive is then brushed onto both surfaces of the substrate and allowed to dry until it is tack free. Epoxy-based adhesives may also been used.

Stencil printing is used to print a tin-lead solder paste into the holes of the substrate. NC650 63/37 tin-lead solder (available from FCT Assembly, Greely, Colo.) is used in this example. The solder is stencil printed first onto the positive face of the substrate. After printing, lead foil is applied to the face and rolled smooth. The foil is a 3 mil thick, 98.5% lead 1.5% tin foil. Other solders, including tin-bismuth and non-lead solders pastes may be used. The substrate is then flipped and solder is stencil printed onto the negative face of the substrate. After printing, lead foil, as above, is applied to the negative face and rolled smooth. Other types of foil may be used including copper, tin-plated copper, nickel-plated copper and zinc-plated copper.

The substrate assembly is next placed into a hot-platen press. Platen temperature (top and bottom) are set for the eutectic of the solder, in this case 183° C. Pressure is applied greater than 100 PSI. The sample is pressed for 40 seconds.

During this operation the solder reflows and makes electrical contact and the adhesive partially cures. The samples are then placed in an oven for 1 hour at 125° C. to complete curing of the rubber-based adhesive.

Pasting frames are then attached to the substrate assembly. The positive and negative pasting frames are machined from ABS plastic 1/16" thick. The pasting frames are attached to the substrate using a rubber-based, thermoset adhesive. The electrodes are placed in a jig with light pressure (1 psi) and cured overnight. After curing, the samples are cleaned using grit blasting (80 grit glass beads) until the lead foil is a uniform matte gray. The samples are then cleaned with compressed air. Lastly, a protective film (3-mil PE tape) is applied to the positive and negative face of the pasting frames.

The resistance of the electrode is measured using 4-point Kelvin probe over 16 points across the substrate using an Extech 380460 digital milliohm meter. All 16 resistance measurements were less than 0.1 mΩ, the limit of the milli-ohm meter. The samples were then dropped from a height of 8 feet. No de-lamination or damage was observed. Further, there were no changes to the resistance'measurements.

Example 2

Bipolar Electrode with ABS Thermo-Plastic Substrate

Acrylonitrile-butadiene-styrene (ABS) plastic sheet is used as the substrate. The substrate is 1.6 mm thick and cut to 197 mm×186 mm. Seven hundred and twenty (720) 1.6 mm diameter holes are milled into the substrate. The samples are lightly sanded on both faces and washed with isopropyl alcohol. A rubber-based, thermoset adhesive is then brushed onto both surfaces of the substrate and allowed to dry until it is tack free.

Stencil printing is used to print a tin-lead solder paste into the holes of the substrate. NC650 63/37 tin-lead solder (available from FCT Assembly, Greely, Colo.) is used in this example. The solder is stencil printed first onto the positive face of the substrate. After printing, lead foil is applied to the face and rolled smooth. The foil is 3 mil thick, 98.5% lead 1.5% tin foil. The substrate is then flipped and solder is stencil printed onto the negative face of the substrate. After printing, lead foil, as above, is applied to the negative face and rolled smooth.

The substrate assembly is then placed into a hot-platen press. Platen temperature (top and bottom) are set for the eutectic of the solder, in this case 183° C. Pressure is not applied due to the low heat distortion temperature of ABS. The platens weight is used to make contact. The sample is pressed for 40 seconds. During this operation the solder reflows and makes electrical contact and the adhesive cures. The samples are then placed in an oven for 1 hour at 125° C. to finish curing of the rubber-based adhesive.

Pasting frames are next attached to the substrate assembly. The positive and negative pasting frames are machined from ABS plastic 1/16" thick. The pasting frames are attached to the substrate using a rubber-based, thermoset adhesive. The electrodes are placed in a jig with light pressure (1 psi) and cured overnight. After curing, the samples are cleaned using grit blasting (80 grit glass beads) until the lead foil is a uniform matte gray.

The resistance of the electrode is measured using 4-point Kelvin probe over 16 points across the substrate using an Extech 380460 digital milliohm meter. The meter is sensitive to 0.1 mΩ. All 1.6 resistance measurements were less than 0.1 mΩ, the limit of the mill-ohm meter. The samples were then dropped from a height of 8 feet. No de-lamination or damage was observed. Further, there were no changes to the resistance measurements.

In other embodiments of this invention other substrate materials have been used including polycarbonate, acrylics, polystyrene and polyvinyl chloride.

Example 3

Effect of Temperature on Resistance of Electrode

The effect of temperature on the resistance of bipolar electrodes made in Example 1 without pasting frames attached is studied by varying the amount of time at different temperatures in the press. The samples are diced using scissors into ~1.25"×1.25" squares such that each specimen has 9 solder-filled, via holes. In some cases the foil lifted at the edge due to the cutting process. Each sample was rolled again to secure the foil to the substrate.

The press is heated to the set point temperature and held to ensure that the platens are uniformly heated. Set point temperatures that were tested ranged from: 172° C. (below the eutectic); 182.5° C. (at the eutectic) to 192.5° C. The temperature was measured using a digital type-K thermal couple with resolution to 0.1° C. When the platens were at the initial temperature the press was opened, the sample placed in the center, the press was closed and the timer started. In all cases, the temperature of the platens decreased when the samples were inserted. For all tests, the platen heater remained off while the samples were in the press to avoid asymmetric heating due to the fact that only the top platen is heated.

After heating, the resistance, of the specimens is measured using an Extech 380460 digital milliohm meter. The meter is sensitive to 0.1 mΩ. The samples are placed between copper electrodes which are compressed using a hand-clamp. The results as a function of time in the platen at the different set point temperatures are plotted in Table A. The testing confirms that as the sample is exposed to temperatures above the eutectic of the solder, the resistance increases several orders of magnitude as the solder is wicked into the positive and negative current collector foils. Below the eutectic of the alloy, the resistance of the electrode remains low. This property of fusing at hazardous temperatures is beneficial to batteries made from the bipolar electrodes disclosed herein as it provides an internal fuse safety mechanism.

TABLE A

EFFECT OF TIME AND TEMPERATURE ON ELECTRODE RESISTANCE

| # | Time, s | L, cm | W, cm | H, cm | R, mΩ | ρ, mΩ-cm | σ, S/cm |
|---|---|---|---|---|---|---|---|
| Platen Temperature Set Point = 187.5 C. | | | | | | | |
| L | 1 | 3.86 | 3.85 | 0.11 | 3.3 | 445.8 | 2.24 |
| K | 2.5 | 3.825 | 4.02 | 0.124 | 2.8 | 347.2 | 2.88 |
| J | 4 | 4 | 3.58 | 0.119 | 2.1 | 252.7 | 3.96 |
| I | 10 | 3.61 | 3.73 | 0.123 | 1.2 | 131.4 | 7.61 |
| H | 16 | 3.63 | 3.66 | 0.122 | 1.2 | 130.7 | 7.65 |
| M | 20 | 3.68 | 3.9 | 0.123 | 1.5 | 175.0 | 5.71 |
| G | 30 | 3.86 | 4.03 | 0.12 | 2000 | 10000.0 | 0.00 |
| Platen Temperature Set Point = 182.5 C. | | | | | | | |
| B | 180 | 3.36 | 3.82 | 0.12 | 0.8 | 87.8 | 11.4 |
| A | 120 | 3.36 | 3.82 | 0.12 | 1 | 109.7 | 9.1 |
| D | 60 | 3.66 | 3.99 | 0.12 | 0.9 | 108.6 | 9.2 |
| E | 90 | 4.01 | 3.83 | 0.11 | 1 | 134.7 | 7.4 |
| F | 45 | 3.76 | 3.93 | 0.12 | 1.3 | 156.2 | 6.4 |
| Platen Temperature Set Point = 185.0 C. | | | | | | | |
| C | 1 | 3.69 | 3.83 | 0.117 | 5.6 | 676.4 | 1.5 |
| B | 5 | 3.76 | 3.88 | 0.118 | 3.4 | 420.4 | 2.4 |
| A | 10 | 3.63 | 3.75 | 0.119 | 1.5 | 171.6 | 5.8 |
| D | 15 | 3.66 | 3.8 | 0.119 | 1 | 116.9 | 8.6 |
| E | 20 | 3.84 | 4.29 | 0.116 | 0.7 | 99.4 | 10.1 |
| F | 25 | 3.71 | 4.18 | 0.117 | 0.6 | 79.5 | 12.6 |
| G | 30 | 3.64 | 4.13 | 0.117 | 0.5 | 64.2 | 15.6 |
| M | 30 | 3.82 | 3.41 | 0.112 | 0.6 | 69.8 | 14.3 |
| N | 30 | 3.96 | 3.47 | 0.114 | 0.7 | 84.4 | 11.9 |
| O | 30 | 3.78 | 3.75 | 0.118 | 0.6 | 72.1 | 13.9 |
| P | 30 | 3.47 | 3.73 | 0.118 | 0.5 | 54.8 | 18.2 |
| L | 35 | 3.92 | 3.72 | 0.118 | 0.8 | 98.9 | 10.1 |
| H | 40 | 4.03 | 4.08 | 0.119 | 0.8 | 110.5 | 9.0 |
| I | 60 | 3.71 | 3.78 | 0.113 | 0.9 | 111.7 | 9.0 |
| K | 90 | 3.78 | 3.87 | 0.114 | 1 | 128.3 | 7.8 |
| J | 120 | 3.72 | 3.37 | 0.113 | 2000 | 10000.0 | 0.0 |

Example 4

Effect of Hole Density on Resistance of Electrode

Bipolar electrodes are made according to Example 1 with a varying number of holes in the substrate. The resistance of the specimens is measured using an Extech 380460 digital milliohm meter. The meter is sensitive to 0.1 mΩ. The results are listed in Table B and show that has the hole-density is decreased the resistance increases. The resistivity of the electrode can be adjusted to optimize battery performance using fewer holes for low power applications and more holes for high power applications.

TABLE B

EFFECT OF HOLE DENSITY ON
ELECTRODE RESISTANCE

| Hole Density Holes/cm$^2$ | Resistance mΩ |
|---|---|
| 2.40 | <0.1 |
| 0.60 | 0.08 ± 0.1 |
| 0.15 | 0.56 ± 0.3 |

Example 5

Effect of Supporting Grid Structure on Bowing

ABS sheets ⅛" thick are cut to 197 mm×18.6 mm to mimic the mechanical bending of a bipolar electrodes as made according to Example 1. A 4.5 mm separator frame is attached to the first ABS sheet using plastic cement. Next, either 0, 1 or 4 internal support structures (4.5 mm thick 20 mm diameter ABS Endo-locks) are attached to the first ABS sheet. Then 3 sheets of BG325 absorbent glass mat (AGM) separator (available from Hollingsworth & Vose, East Walpole, Mass.) are die cut to fit in the separator frame with the holes to accommodate the internal support structures. These are placed into the AGM. Plastic cement is then applied to the top surface of the separator frame and internal support structures with the second plastic plate placed on top. The assembly is then compressed resulting in 30% compression of the AGM. Lastly, a simple vent port is attached to the separator frame to allow pressure to be applied to the sample. The sample is allowed to cure overnight.

The maximum displacement height is measured using a depth gauge as air pressure is applied to the sample. The measured displacement in mm is listed in Table C showing the effectiveness to reduce bowing of the sample.

TABLE C

MEASURED MAXIMUM DISPLACEMENT AS FUNCTION OF
APPLIED AIR PRESSURE AND EFFECT OF ENDO-LOCKS

| Applied Pressure, mm Hg | 0 Endo-locks, mm | 1 Endo-lock, mm | 4 Endo-locks, mm |
|---|---|---|---|
| 0 | 1.5 | 0.4 | 0.05 |
| 40 | 2.7 | 0.3 | 0.1 |
| 60 | 3.9 | 0.7 | 0.1 |
| 80 | 5.3 | 1.0 | 0.1 |
| 100 | 6.5 | 1.4 | 0.2 |
| 120 | 8.0 | 1.9 | 0.2 |

Example 6

Bipolar Pb-Acid Battery Made From Bipolar Electrodes

Electrodes are made according to Example 1. The electrodes are pasted with lead-oxide paste commonly used in the lead-acid battery industry using standard pasting equipment. The positive paste is applied first. The paste as not flash-dried in this example but flash drying may be used as well. The negative paste is then applied. The plates are then cured using standard cure ovens used in the lead-acid battery industry. After cure, the samples are inspected for adhesion loss, paste weight uniformity and damage. Of 70 electrodes pasted only 3 electrodes had slight paste adhesion issues. The variance of paste weight for the bipolar electrodes was less than 2% one-sigma deviation.

A bipolar battery is assembled by first removing the protective film from the pasted bipole and monopole plates. A copper terminal is solder-welded to the positive monopole and to the negative monopole. A ⅛" thick piece of ABS is then glued to the outside faces of the monopole using plastic cement. The bipolar battery is built with a positive monopole plate, 5 bipole plates and a negative monopole plate. ABS separator frames and ABS endo-locks (1 per cell in the center) are attached to the positive face of the positive monopole plate and the 5 bipole plates using plastic cement. The separator components are 4.5 mm thick. Three sheets of BG300 AGM (available from Hollingsworth & Vose, East Walpole, Mass.) (die cut to size) are placed in the separator frame. Plastic cement is then applied to the negative face of the separator frame and endo-lock and the negative face of the adjacent bipole plate and the negative monopole plate. The plates are then stacked on each other and pressed in a 6-ton jack-press to a controlled displacement. The assembled battery is allowed to cure overnight. The battery is removed from the press and the four sides of the assembly are potted with epoxy and allowed to cure for 24 hours. After curing, a valve assembly is attached to each separator frame. The valve is a 1-psi mushroom pop-valve (available from MiniValve, Yellow Springs, Ohio). All cells are pressure tested to 1 psi air-pressure to ensure no leaks. Lastly, five ⅛" fill holes are drilled in the bottom of each of the six separator frames.

The battery is placed in a shallow tub with 1.265 s.g. sulfuric acid with sufficient depth to ensure that the level of battery acid is above the bottom of the AGM separator sheet. The AGM wicks the sulfuric acid to complete fill in 40 minutes. The battery is then placed on formation while, remaining in the acid. The battery is formed to 250 Ah/lb of PAM using a multi-step formation schedule over 4 days. After formation the battery is removed from the acid tub. The bottom is lightly washed with sodium bicarbonate solution and then hot-melt adhesive is used to seal the bottom fill ports. The battery is washed again using sodium bicarbonate solution and put on rest for 24H. The open cell voltage of the battery is 12.91V. In other examples, batteries have been left on stand for over one month. Stand loss ranged from 0.7%/month to 4.4%/month which is consisted with commercially available lead-acid batteries.

The battery is tested using testing equipment available from Bitrode, Fenton, Mo., discharging at constant rate to a cut-off voltage of 10.5 volts with 120% return (limited to 14.6V). The results are listed in Table D.

TABLE D

DISCHARGE TIME OF BIPOLAR BATTERY

| Rate, Amp | Time, h | mAh/gm PAM |
|---|---|---|
| 0.5 | 24.28 | 120.2 |
| 1.0 | 10.26 | 99.6 |
| 2.0 | 3.95 | 76.7 |
| 3.0 | 2.36 | 68.8 |
| 5.0 | 1.20 | 58.3 |
| 10.0 | 0.41 | 39.8 |

Example 7

Bipolar Pb-Carbon Battery Made From Bipolar Electrodes

Electrodes are made according to Example 1. The electrodes are pasted with lead-oxide paste commonly used in the lead-acid battery industry using standard pasting equipment. The positive paste is applied first. The negative paste is not pasted. The plates are then cured using standard cure ovens used in the lead-acid battery industry. After cure, the samples are inspected for adhesion loss, paste weight uniformity and damage. After inspection, negative anode slurry is pasted into the negative pasting frame. The slurry is made from graphene (available from XG Sciences, East Lansing, Mich.) and sulfuric acid.

A bipolar battery is assembled by first removing the protective film from the pasted bipole and monopole plates. A copper terminal is solder-welded to the positive monopole and to the negative monopole. A 1/8" thick piece of ABS is then glued to the outside faces of the monopole using plastic cement. The bipolar battery is built with a positive monopole plate, 5 bipole plates and a negative monopole plate. ABS separator frames and ABS endo-locks (1 per cell in the center) are attached to the positive face of the positive monopole plate and the 5 bipole plates using plastic cement. The separator components are 4.5 mm thick. Three sheets of BG300 AGM (available from Hollingsworth & Vose, East Walpole, Mass.) (die cut to size) are placed in the separator frame. Plastic cement is then applied to the negative face of the separator frame and endo-lock and the negative face of the adjacent bipole plate and the negative monopole plate. The plates are then stacked on each other and pressed in a 6-ton jack-press to a controlled displacement. The assembled battery is allowed to cure overnight. The battery is removed from the press and the four sides of the assembly are potted with epoxy from Quadrant chemical and allowed to cure for 24 hours. After curing a valve assembly is attached to each separator frame. The valve is a 1-psi mushroom pop-valve (available from MiniValve, Yellow Springs, Ohio). All cells are pressure tested to 1 psi air-pressure to ensure no leaks. Lastly, five 1/8" fill holes are drilled in the bottom of each of the six separator frames.

The battery is placed in a shallow tub with 1.265 s.g. sulfuric acid with sufficient depth to ensure that the level of battery acid is above the bottom of the AGM separator sheet. The AGM wicks the sulfuric acid to complete fill in 40 minutes. The battery is then placed on formation while remaining in the acid. The battery is formed to 250 Ah/lb of PAM. After formation the battery is removed from the acid tub. The bottom is lightly washed with sodium bicarbonate solution and then hot-melt adhesive is used to seal the bottom fill ports. The battery is washed again using sodium bicarbonate solution and put on rest for 24H. The open cell voltage of the battery is 4.28. In another example, a single cell Pb-Carbon battery was made according to the example and was cut apart to inspect the positive active material for formation. We found the PAM to be a uniform chocolate brown color indicating formation.

The battery is tested using testing equipment available from Bitrode, Fenton, Mo., discharging at constant rate to a cut-off voltage of 10.5 volts with 120% return (limited to 14.6V). The results are listed in Table E.

TABLE E

| DISCHARGE TIME OF BIPOLAR PB-C BATTERY | | | |
| --- | --- | --- | --- |
| Rate, Amp | Dis. Time, h | Dis. Time, s | Cap. mAs/gm |
| 0.5 | 0.02 | 60 | 260.9 |
| 1 | 0.01 | 36 | 313.0 |
| 2 | 0.00 | 14 | 243.5 |
| 3 | 0.00 | 8 | 208.7 |

TABLE E-continued

| DISCHARGE TIME OF BIPOLAR PB-C BATTERY | | | |
| --- | --- | --- | --- |
| Rate, Amp | Dis. Time, h | Dis. Time, s | Cap. mAs/gm |
| 5 | 0.00 | 4 | 173.9 |
| 10 | 0.00 | 1 | 87.0 |

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated, embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention claimed is:

1. An article comprising:
a substrate having:
- a first surface and a second surface, the first surface placed in planar contact with a negative current collector sheet via an adhesive layer;
- one or more edges so that at least one edge of the substrate is in planar contact with at least one edge of a negative pasting frame member;
- a thermal degradation temperature; and
- a plurality of openings having straight walls formed therein, wherein the plurality of openings are filled with an electrically conductive material that undergoes a phase transformation at a temperature that is below the thermal degradation temperature of the substrate so that at an operating temperature of a battery assembly containing the bipolar battery laminate structure that is below the phase transformation temperature the substrate has an electrically conductive path via the electrically conductive material between the first surface and the second surface of the substrate and at a temperature that is above the phase transformation temperature, the electrically conductive material undergoes a phase transformation that disables electrical conductivity via the electrically conductive path;

a positive current collector sheet, placed in planar contact with the second surface of the substrate via a second adhesive layer; wherein the article is useful as a bipolar plate in the battery assembly; wherein the electrically conductive material is a solder paste that comprises a mixture of two or more of lead, tin, nickel, zinc, lithium, antimony, cooper, bismuth, indium or silver.

2. An article according to claim 1 wherein the positive current collector sheet is disposed between the substrate and the positive active material and the negative current collector sheet is disposed between the substrate and the negative material.

3. An Article according to claim 2 wherein the substrate has edges capable of planar contact at the edges of the substrate.

4. An article according to claim 1 wherein the openings in the substrate have a diameter of from about 0.2 mm to about 5 mm.

5. An article according to claim 1 wherein the substrate comprises a non-conductive material.

6. An article according to claim 5 wherein the substrate comprises acrylonitrile butadiene styrene.

7. An article according to claim 1 wherein the electrically conductive material is a solder paste that exhibits melting temperature below 240° C.

8. An article according to claim 1 wherein the solder paste is a eutectic mixture.

9. A bipolar battery laminate structure comprising:
a first separator frame having one or more edges;
a negative pasting frame member having one or more edges wherein at least one edge of the negative pasting frame member is in planar contact with at least one edge of the first separator frame;
a supporting grid structure extending between the one or more negative pasting frame edges;
a substrate having:
    a first surface and a second surface, the first surface placed in planar contact with and adhered to a negative current collector sheet via a first adhesive layer;
    one or more edges so that at least one edge of the substrate is in planar contact with at least one edge of the negative pasting frame member;
    a thermal degradation temperature; and
    a plurality of openings having straight walls formed therein, wherein the plurality of openings are filled with an electrically conductive malarial that undergoes a phase transformation at a temperature that is below the thermal degradation temperature of the substrate so that at an operating temperature of a battery assembly containing the bipolar battery laminate structure that is below the phase transformation temperature the substrate has an electrically conductive path via the electrically conductive material between the first surface and the second surface of the substrate and at a temperature that is above fee phase transformation temperature, the electrically conductive material undergoes a phase transformation that disables electrical conductivity via the electrically conductive path;
a positive current collector sheet, placed in planar contact with the second surface of the substrate via a second adhesive layer, a positive pasting frame member having one or more edges wherein at least one edge of the positive pasting frame member is in planar contact with at least a second edge of the substrate;
a second supporting grid structure extending between the one or more positive pasting frame edges; and
a second separator frame having one or more edges, wherein at least one edge of the second separator frame is in planar contact with at least one edge of the positive pasting frame member
    wherein the planar contact of the edges of the separator frames, the negative and positive pasting frame members and the substrate form an external seal on the battery so that an electrolyte introduced therein will not leak from within the battery
wherein the electrically conductive material is a solder paste that comprises a mixture of two or more of lead, tin, nickel zinc, lithium, antimony, copper, bismuth, indium or silver.

10. The battery structure of claim 9, wherein the electrically conductive material melts and fails to fill the plurality of openings at any temperature above the melting point of the electrically conductive material.

11. The battery structure of claim 9, wherein any unfilled openings in the substrate sheets will cause at least one of: (i) an open circuit within the cell; (ii) increased resistance within the cell; and (iii) battery failure.

12. The battery structure of claim 9, wherein the negative and positive current collector sheets are composed of a foil material.

13. The battery structure of claim 9, wherein the substrate is composed of a material having a heat distortion temperature sufficient to withstand any melting of the electrically conductive material.

14. The battery structure of claim 9, wherein one or more of the negative or positive pasting frame members includes one or more support members connected to the opposite pasting frame to reduce the effective distance between the edges of the negative or positive pasting frame members within the battery structure.

15. A battery structure according to claim 9 wherein the opening in the substrate have a diameter of from about 0.2 mm to about 5 mm.

16. A battery structure according to claim 15 wherein the substrate comprises a non-conductive material.

17. A battery structure according to claim 16 wherein the substrate comprises acrylonitrile butadiene styrene.

18. A battery structure according to claim 9 wherein the solder paste exhibits a melting temperature below 240° C.

19. An article according to claim 9 wherein the solder paste is a eutectic mixture.

* * * * *

UNITED STATES PATENT AND TRADEMARK OFFICE
CERTIFICATE OF CORRECTION

PATENT NO. : 8,357,469 B2
APPLICATION NO. : 12/690533
DATED : January 22, 2013
INVENTOR(S) : Shaffer, II et al.

Page 1 of 1

It is certified that error appears in the above-identified patent and that said Letters Patent is hereby corrected as shown below:

In the Claims:

Column 23, Claim 9, line 52 "malarial" should read:
"material"

Column 24, Claim 9, line 1 "fee" should read:
"the"

Signed and Sealed this
Fourth Day of June, 2013

Teresa Stanek Rea
*Acting Director of the United States Patent and Trademark Office*